(12) United States Patent
Belanger et al.

(10) Patent No.: US 9,845,080 B2
(45) Date of Patent: Dec. 19, 2017

(54) WRAP-AROUND VEHICLE WASH COMPONENT

(71) Applicant: WashMe Properties, LLC, Northville, MI (US)

(72) Inventors: Michael J. Belanger, Northville, MI (US); David L. Tognetti, Howell, MI (US)

(73) Assignee: WashMe Properties, LLC, Northville, MI (US)

( * ) Notice: Subject to any disclaimer, the term of this patent is extended or adjusted under 35 U.S.C. 154(b) by 0 days.

(21) Appl. No.: 15/135,350

(22) Filed: Apr. 21, 2016

(65) Prior Publication Data

US 2016/0311408 A1    Oct. 27, 2016

Related U.S. Application Data

(60) Provisional application No. 62/151,256, filed on Apr. 22, 2015.

(51) Int. Cl.
*B60S 3/04* (2006.01)
*B60S 3/06* (2006.01)

(52) U.S. Cl.
CPC ............... *B60S 3/04* (2013.01); *B60S 3/063* (2013.01)

(58) Field of Classification Search
CPC ............... B60S 3/04; B60S 3/06; B60S 3/063
See application file for complete search history.

(56) References Cited

U.S. PATENT DOCUMENTS 5,715,558 A * 2/1998 Johnson .................. B60S 3/063
15/53.2

* cited by examiner

*Primary Examiner* — Randall Chin
(74) *Attorney, Agent, or Firm* — John S. Artz; Dickinson Wright PLLC

(57) ABSTRACT

A vehicle treatment system for a vehicle wash system includes a frame portion in communication with a brush assembly for treating front and rear vehicle surfaces. The brush assembly is rotated about an axis of rotation such that its associated wash media elements rotate therewith. The brush assembly includes a support carrier that is moveable with respect to the frame portion. The brush assembly includes a biasing mechanism that switches the brush assembly axis of rotation from a vertical orientation to a non-vertical orientation. A control system communicates with the support carrier to move the brush assembly along the front surface of the vehicle in a substantially vertical position and along the rear surface of the vehicle in a non-vertical position.

33 Claims, 13 Drawing Sheets

WRAP-AROUND VEHICLE WASH COMPONENT

CROSS-REFERENCE TO RELATED APPLICATIONS

The present application claims priority to U.S. Provisional Application Ser. No. 62/151,256, entitled "A Wrap-Around Vehicle Wash Component", filed Apr. 22, 2015, which is hereby incorporated by reference herein.

TECHNICAL FIELD

The present disclosure relates generally to a wrap-around brush for a vehicle car wash system. More specifically, the present disclosure relates to a wrap-around brush for a vehicle car wash system that more accurately follows the exterior contours of a vehicle being washed and also provides improved cleaning capabilities.

BACKGROUND OF THE DISCLOSURE

It is well known to support a pair of car wash brushes having substantially vertical axes of rotation on booms or "knuckles" which can pivot about vertical axes of rotation adjacent to a vehicle treatment area so as to engage and scrub a vehicle exterior. These wrap-around brushes typically employ a power cylinder to urge the brushes to their outermost or extended positions which are generally adjacent the centerline of the vehicle treatment area. When a vehicle passes between the brushes, the cylinders are deactivated allowing gravity to move the brushes back toward a retracted position on the boom or knuckle. In the retracted (or not fully extended) position, the brushes can engage the side surfaces of the vehicle. When the vehicle has traveled a sufficient distance, the power cylinder can be reactivated urging the brushes toward the extended or outermost positions so that they can engage and clean the rear surface of the vehicle. These types of brushes have suffered from various difficulties, including with respect to proper programming of the timing of the initiation of the outward re-extension of the brushes to accommodate vehicles of different lengths and widths. This has resulted in insufficient cleaning of the rear surfaces of many vehicles.

Various attempts have been made to try and solve these and other issues with prior wrap-around brushes. Specifically, wrap-around brushes have been developed that include a ball pivot at the upper end of the rotary brush to allow the brush to pivot away from a vertical position upon contact with a vehicle such that the brush is disposed at an angle with respect to vertical. This arrangement provides some improved cleaning of the vehicle side surfaces and also helps minimize damage to mirrors and antennas. However, these brushes do not provide sufficient cleaning of the rear vehicle surfaces, particularly in vehicle washes with higher speed conveyors. This is in part due to the fact that their configuration does not allow the brush to contact the vehicle rear exterior for a long enough dwell time. These brushes also suffer from an ability to effectively clean angled surfaces.

It would therefore be desirable to provide an improved wrap-around brush that addresses the above limitations.

SUMMARY OF THE DISCLOSURE

It is therefore an aspect of the present disclosure to provide a wrap-around brush for a vehicle wash system that provides improved cleaning of front, side and rear surfaces of a vehicle.

It is another aspect of the present disclosure to provide a wrap-around brush for a vehicle wash system that provides improved vehicle cleaning, including at high conveyor speeds.

It is still another aspect of the present disclosure to provide a wrap-around brush for a vehicle wash system that includes increased forgiveness to accommodate differently configured vehicle surfaces.

It is a further aspect of the present disclosure to provide a wrap-around brush for a vehicle wash system that minimizes damage to a vehicle exterior.

It is yet another aspect of the present disclosure to provide a wrap-around brush for a vehicle wash system that provides a longer period of contact with a vehicle rear surface for increased cleaning.

In accordance with the above and the other aspects of the present disclosure an automated vehicle treatment system is provided. The system includes a frame portion to be disposed adjacent a vehicle treatment area. The frame portion is in communication with a brush assembly which is configured to treat at least front and back surfaces of a vehicle in the vehicle treatment area. The brush assembly includes a motorized shaft that effectuates rotation thereof about an axis of rotation. A plurality of media attachment mechanism are in communication with the motorized shaft. Each of the plurality of media attachment mechanism includes a plurality of wash media elements extending therefrom. The motorized shaft is in communication with a biasing mechanism for urging the motorized shaft from a substantially vertical position to a non-vertical position. The control system can communicate with the brush assembly such that it traverses the front surface of the vehicle with the shaft in a substantially vertical position and traverses the rear surface of the vehicle with the shaft in the non-vertical position.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION OF THE INVENTION

Figure 1:
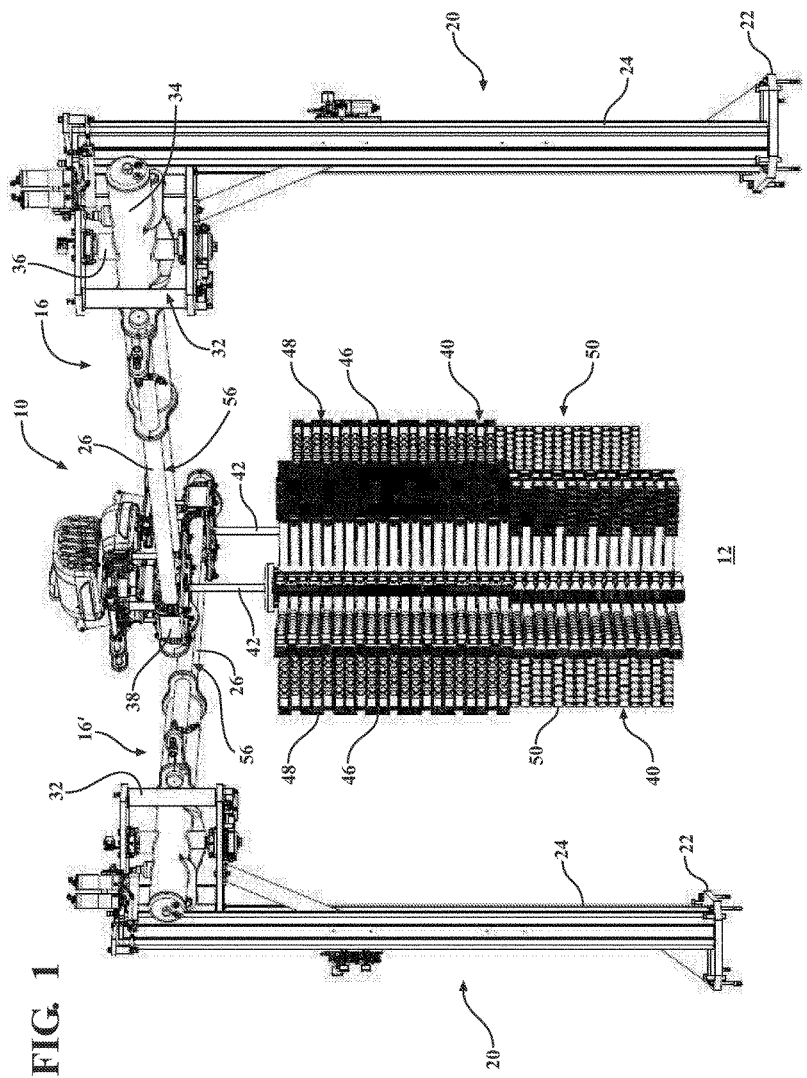
FIG. 1 is a front on illustration of a vehicle treatment component for a vehicle wash system in a starting position according to an aspect of the present disclosure.
Figure 2:
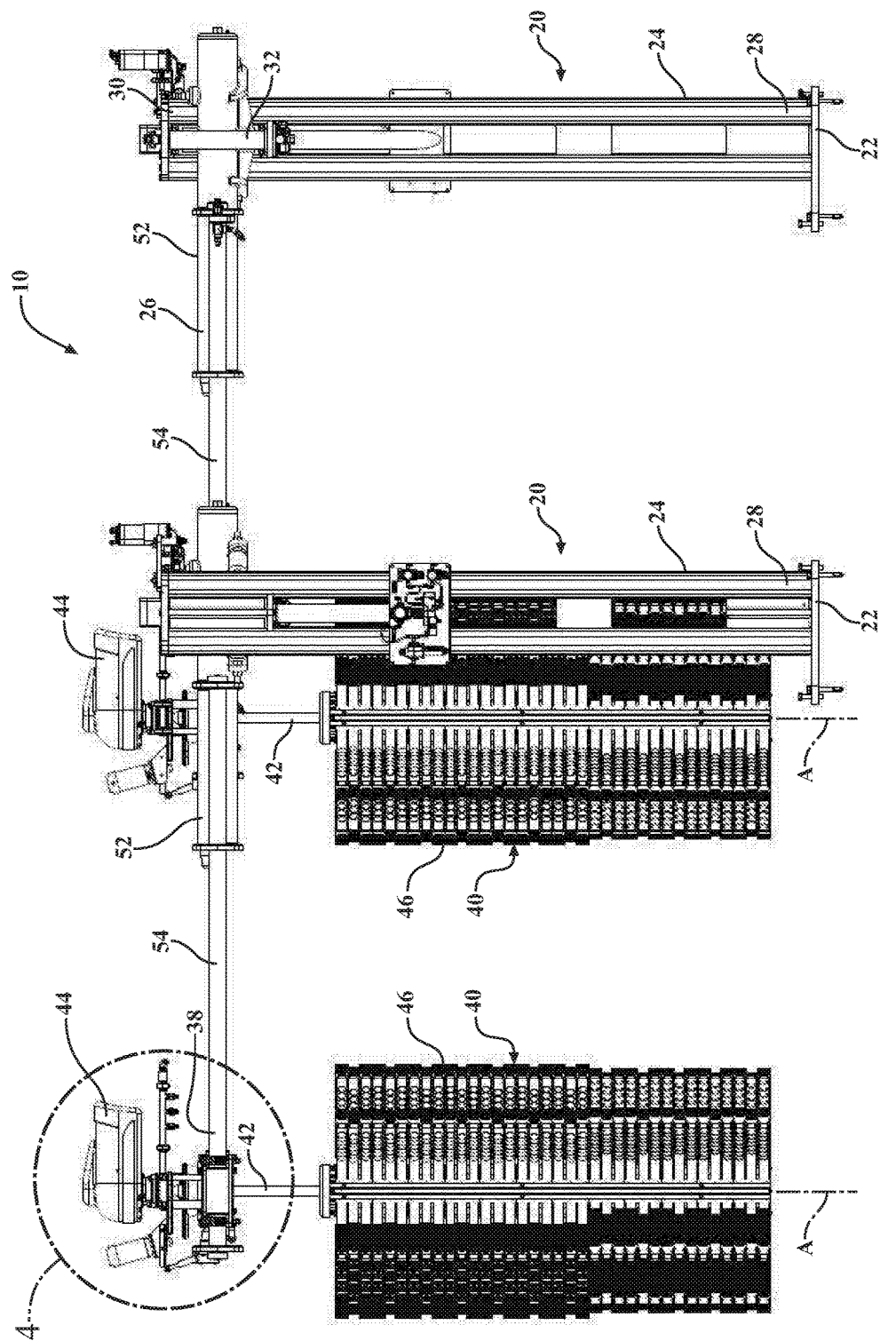
FIG. 2 is a side view of a vehicle treatment component for a vehicle wash system with the brush assemblies oriented in a generally vertical position according to an aspect of the disclosure.

The present disclosure relates to a wrap-around brush assembly 10 for a vehicle wash system. The wrap-around brush assembly 10 may be incorporated into a tunnel car wash, where a vehicle 12 is conveyed through the wash process by a conveyor or the like, as is known in the art. The wrap-around brush assembly 10 may also be incorporated into other suitable wash processes and systems, such as a roll-over wash system. It will be appreciated that the disclosed wrap-around brush assembly 10 could also be employed in connection with a variety of other applications and wash systems. The wrap-around brush assembly 10 can provide significant benefits for vehicle wash systems that utilize conveyors to operate at higher speeds. However, the wrap-around brush assembly 10 may also provide benefits for conveyor systems that operate at lower or mediums speeds.

According to an aspect, the wrap-around brush assembly 10 may be housed within a vehicle wash facility having an entrance end where a vehicle enters and an exit end where the vehicle leaves. The wrap-round brush assembly 10 may be utilized in connection with a variety of other vehicle wash components that work together to perform a wash process that cleans a vehicle exterior. According to a further aspect, the warp-around brush assembly 10 may be configured to be disposed adjacent a vehicle treatment area 12 through which a vehicle 14 is conveyed or positioned. According to still another aspect, the wrap-around brush assembly 10 can include a pair of identical brush assemblies with a first brush assembly 16 disposed on one side of the vehicle treatment area and a second brush assembly 16' disposed on the other side of the vehicle treatment area 14 for engaging and cleaning opposing sides of the vehicle 14 as well as front and rear vehicle surfaces.

With reference to FIGS. 1 through 5, each brush assembly 16, 16' can include a frame portion 20 having a base 22 for engaging ground, a vertical upright member 24, and a boom portion 26. According to an aspect, the vertical upright 24 may be secured to the base 22 at a lower end 28. The vertical upright member 24 may include an upper end 30 with a window portion 32 that pivotally secures the boom portion 26 allowing it to move generally in an arc toward (inwardly) and away (outwardly) from a centerline of the vehicle treatment area 12 as it engages a vehicle surface. The pivotal engagement between an inner end 34 of the boom portion 26 and the window portion 32 can be accomplished by a bearing 36. It will be appreciated that other suitable attachment mechanism that allow for pivotal movement of the boom portion 26 with respect to the vertical upright member 24 may also be employed. It will also be appreciated that the frame portion 20 may have a variety of different configurations and may be disposed adjacent the vehicle treatment area 12 in a variety of suitable ways. It will further be appreciated that the frame portion 20 could consist of more or less components as desired.

According to an aspect, the boom portion 26 may include an outer end 38 which is configured to communicate with a brush portion 40. The brush portion 40 can include a rotatable shaft portion 42 that is driven by a drive mechanism 44 such as an electric motor about an axis of rotation. It will be appreciated that a variety of other suitable drive mechanism may be employed to effectuate rotation of the shaft portion 42. According to an aspect, the rotatable shaft portion 42 may be formed of a rigid metal material. However, the shaft portion 42 could be formed of a variety of other suitable materials. The shaft portion 42 may include or communicate with a variety of media attachment mechanism, such as channels or the like formed thereon. A plurality of wash media elements 46 may be fixedly secured to the shaft portion 42 by securing an inner end thereof into a media attachment mechanism such they rotate with the shaft portion 42. It will also be appreciated that the shaft portion 42 could also be in communication with a hub portion having integral media attachment mechanism to which the wash media elements are directly attached. According to an aspect, the wash media elements 46 may contact a vehicle exterior as the shaft portion 42 rotates to assist with the cleaning process. According to another aspect, the wash media elements 46 may be constructed such that they are self-supporting along their length. An exemplary wash media element 46, material and configuration is disclosed in Applicant's U.S. Pat. No. 8,990,993, entitled "Vehicle Wash Component", which is hereby incorporated by reference as though set forth fully herein. According to an aspect, the wash media elements 46 that make up each of the brush portions 40 can all have substantially the same length. Put another way, a footprint of an upper section 48 of the brush portion 40 may be substantially the same as a footprint of the lower section 50 of the brush portion 40. It will be appreciated that according to another aspect, the brush portion 40 could employ media elements having different lengths disposed in different areas of the brush portion 40. Additionally, the media elements 46 could be arranged in different fashions on the upper section 48 and the lower section 50.

According to an aspect, the boom portion 26 can include an inner arm portion 52 and an outer arm portion 54 that is telescopically moveable with respect to the inner arm portion 52 in order to move the brush portion 40 linearly toward and away from the vehicle treatment area 12. This can allow the brush portion 40 to be maintained in contact with the vehicle exterior for a longer period of time. According to another aspect, the outer arm portion 54 can include a channel portion 56 which retains the rotatable shaft portion 42 and within which the shaft portion 42 can travel as the brush portion 40 moves inwardly and outwardly, as discussed in more detail herein.

According to a still further aspect, a plurality of fluid delivery mechanism 58 may be in communication with the brush portion 40 to deliver fluid for application onto the wash media elements 46 for use on an exterior surface of the vehicle 14. According to another aspect, the fluid can also be applied directly to the vehicle exterior. The fluid may be stored at a fluid delivery source and transmitted to the fluid delivery mechanism 58 by way of a fluid line 60 as is known. The fluid line 60 may be in communication with a manifold 62, which can communicate with the fluid delivery mechanism 58. According to an aspect, the fluid delivery mechanism 58 may consist of a plurality of nozzles 64. However, a variety of other suitable mechanism for delivering fluid may be employed. As shown, the manifold 62 may be secured to the brush portion 40 so it can travel with the brush portion 40 and communicate therewith throughout its range of travel within the channel portion 56. It will be appreciated that a variety of different types of fluid could be employed with the fluid delivery mechanism.

Figure 4:
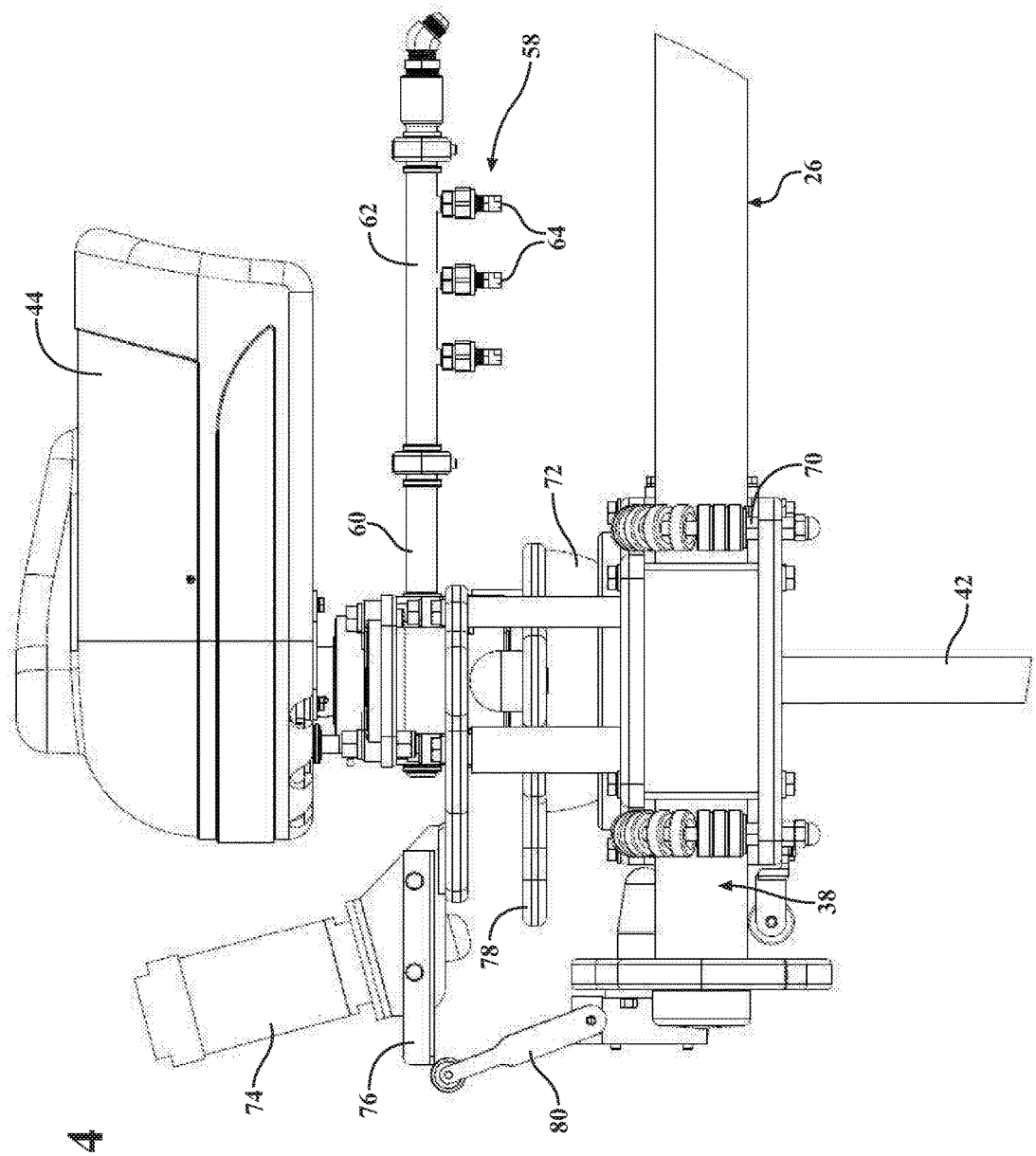
FIG. 4 is an enlarged view of the portion of the vertically oriented brush assembly in the circle labeled 4 in FIG. 2.
Figure 5:
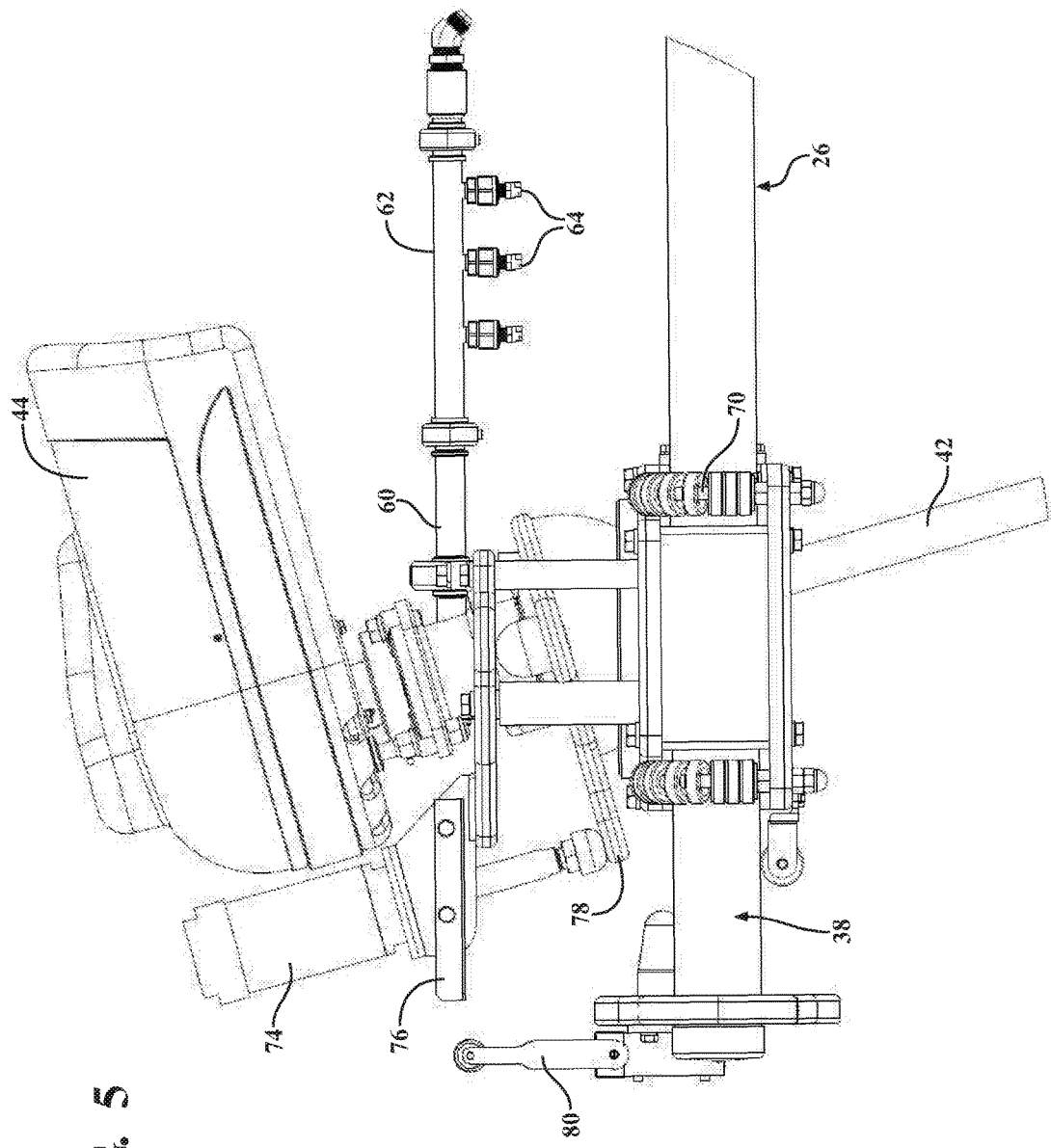
FIG. 5 is an enlarged view of the portion of the angled brush assembly in the circle labeled 5 in FIG. 3.
Figure 6:
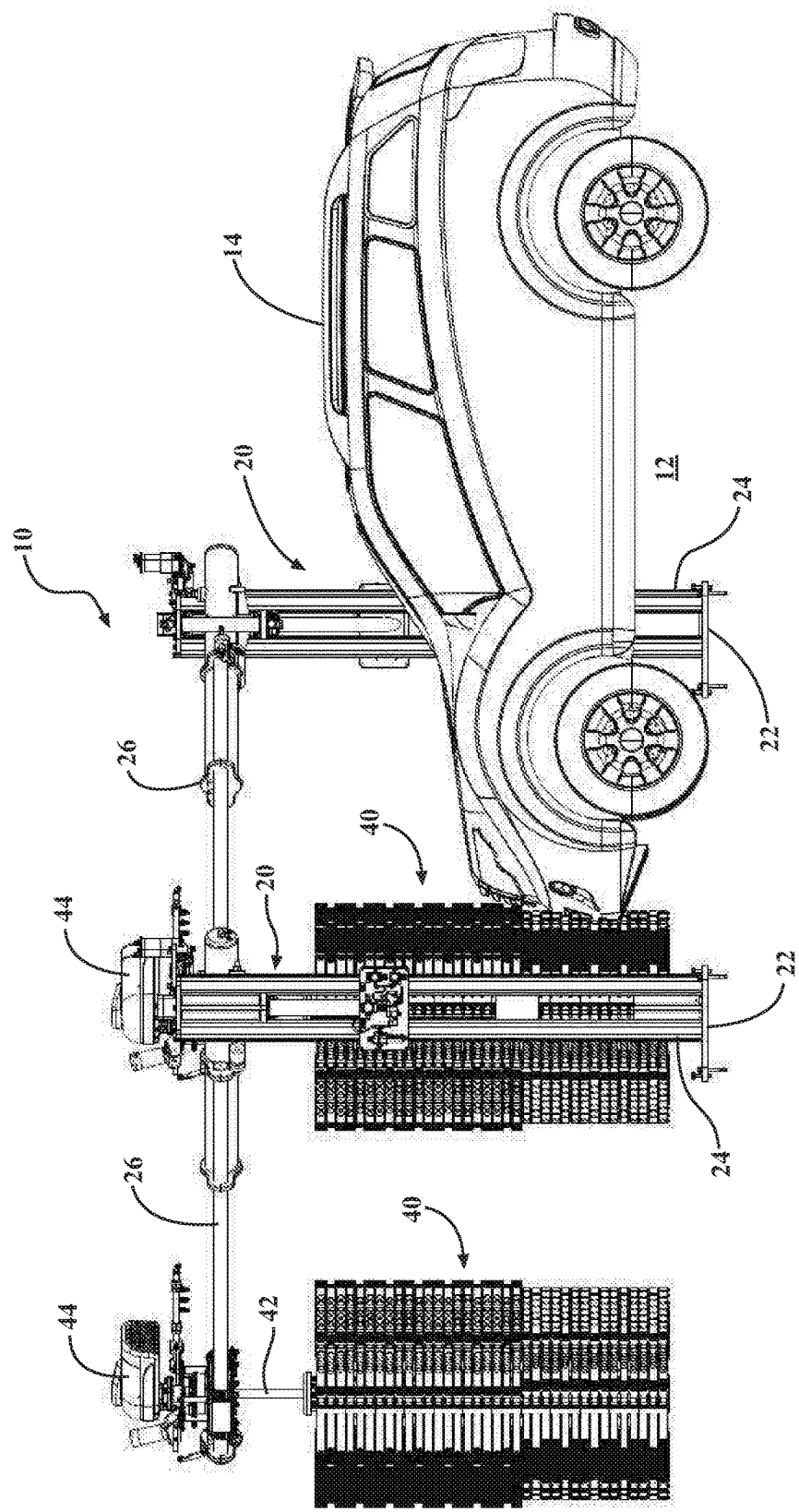
FIG. 6 is a side view of a vehicle treatment component in a starting position as a vehicle approaches for treatment according to an aspect of the disclosure.

According to a still further aspect as best shown in FIGS. 4 and 5, an exemplary connection of the brush portion 40 to the boom portion 26 is illustrated. According to an aspect, the brush portion 40 may be in communication with the boom portion 26 by a support carrier 70. The support carrier 70 can be configured to slide linearly along the boom portion 26. According to an aspect, the support carrier 70 can include a spherical bearing 72 that can nest within a seat formed in an upper surface of the support carrier 70. The spherical bearing 72 may be mounted or otherwise secured to an upper end of the shaft portion 42. The spherical bearing 72 can move freely within the support carrier 70 such that the shaft portion 42 and thus the brush portion 40 can pivot away from an orientation where the shaft portion 42 is plum or vertical with respect to ground, as discussed herein, to an orientation where the shaft portion 42 and the axis of rotation are at a non-vertical angle with respect to ground.

According to another aspect, the support carrier 70 may include a cylinder 74 such as a pneumatic cylinder, mounted on a lever arm 76. The cylinder 74 may also be in communication with a pivot arm 78, which is mounted or otherwise disposed on the support carrier 70. According to a further aspect, when the support carrier 70 can be located adjacent the outer end 38 of the boom portion 26, and the lever arm 76 can engage the switch rod 80 such that the spherical bearing 72 may be retained in an orientation such that the shaft portion 42 is plum or vertical, as shown generally in FIGS. 1, 2, and 4. In this position, the cylinder 74 may be in a retracted position, such that the spherical bearing 72 may be retained in place and the shaft portion 42 may be oriented in a generally vertical direction.

Figure 3:
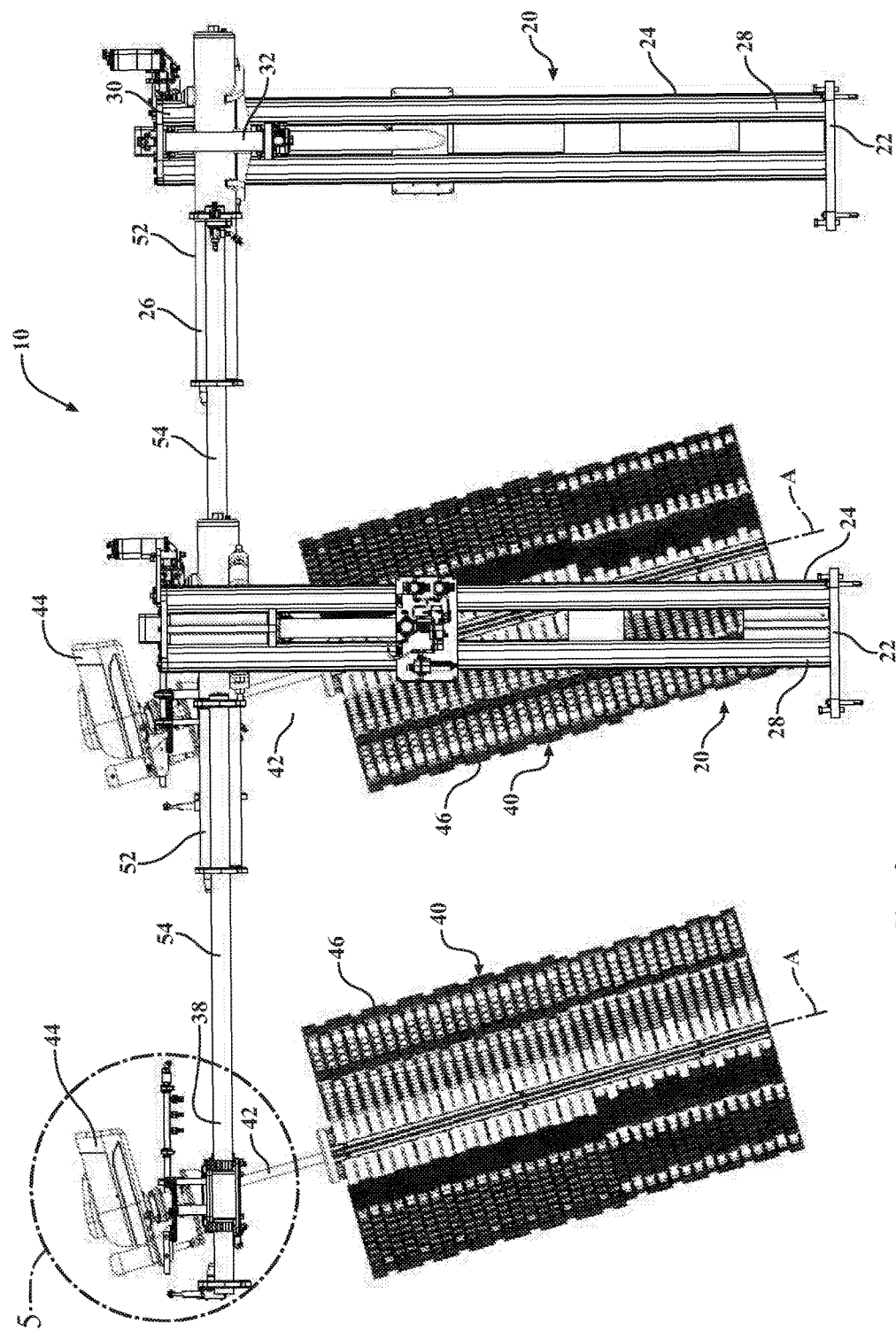
FIG. 3 is a side view of a vehicle treatment component for a vehicle wash system with the brush assemblies oriented in a non-vertical position according to an aspect of the disclosure.

According to an aspect, as the support carrier 70 moves away from the outer end 38 of the boom portion 26, the switch rod 80 can disengage the lever arm 76 such that the cylinder 74 can move to an extended portion (shown best in FIGS. 3 and 5). It will be appreciated that the brush portion 40 can be urged away from the outer end 38 of the boom portion 26 due to the force exerted by the vehicle upon contact with the brush portion 40 or a variety of other suitable ways, including electronic or mechanical control. According to another aspect, the disengagement of the lever arm 76 from the cylinder 74 can cause the cylinder 74 to move to the extended position. When the cylinder 74 moves to the extended position, the pivot arm 78 can move downwardly causing the spherical bearing 72 to move within its seat such that the shaft portion 42 is cocked at an angle. It will be appreciated that the angle at which the shaft portion 42 is displaced can vary as desired. According to another aspect, the angle can be varied to match differently configured vehicles. Instead of a cylinder, a variety of other suitable actuated mechanism for angling the shaft portion 42 may also be employed. It will be appreciated that in the extended and retracted position the shaft portion 42 can be locked in place.

Referring now to FIGS. 6 through 11 which illustrate an exemplary operation of the wrap-around brush assembly 10 in accordance with an aspect of the disclosure. According to the aspect shown in FIG. 6, the brush assembly 10 can have an initial starting position where both the brush assemblies 16, 16' are disposed adjacent a center of the vehicle treatment area 12. In this configuration, as also shown in FIG. 1, the first brush assembly 16 can overlap the second brush assembly 16' to ensure that they provide full coverage for a vehicle front end, i.e., do not leave any area between then untreated. According to an aspect, the brush assemblies 16, 16' can be offset from one another to allow the first brush assembly 16 to contact the front end of the vehicle.

According to an aspect, the brush assemblies 16, 16' can be kept in the starting position by a piston arrangement in the inner arm portion 52 of the boom portion 26 that biases the outer arm portion 54 outwardly. A variety of other suitable ways for placing the brush 10 in the starting position may be employed. According to an aspect, a front surface of a vehicle 14 in the vehicle treatment area 12 can contact the brushes 16, 16' as the vehicle travels through the vehicle treatment area 12. As the vehicle 14 continues forward, the boom portion 26 can pivot outwardly (away from the centerline of the vehicle treatment area 12) allowing the brush assemblies to travel along the front surface of the vehicle 12 thereby cleaning same. According to an aspect and as shown, the support carrier 70 may be located adjacent the outer end 38 of the boom portion 26 as the brush portion 40 travels along the vehicle front surface. As such, the rotatable shaft portion 42 can be oriented generally plum or vertical.

Figure 7:
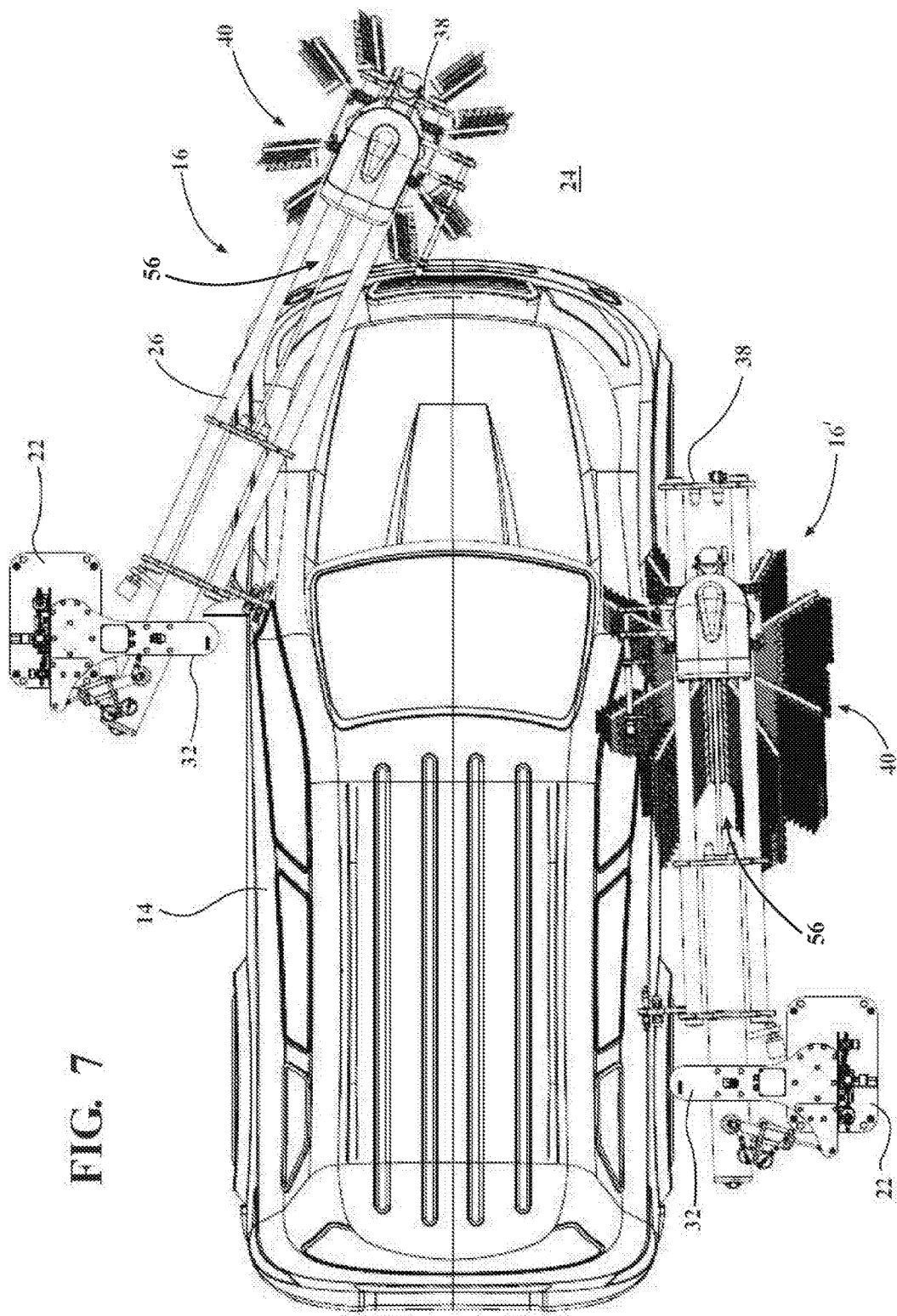
FIG. 7 is a top view of a vehicle treatment component engaging forward and side portions of a vehicle according to an aspect of the disclosure.
Figure 8:
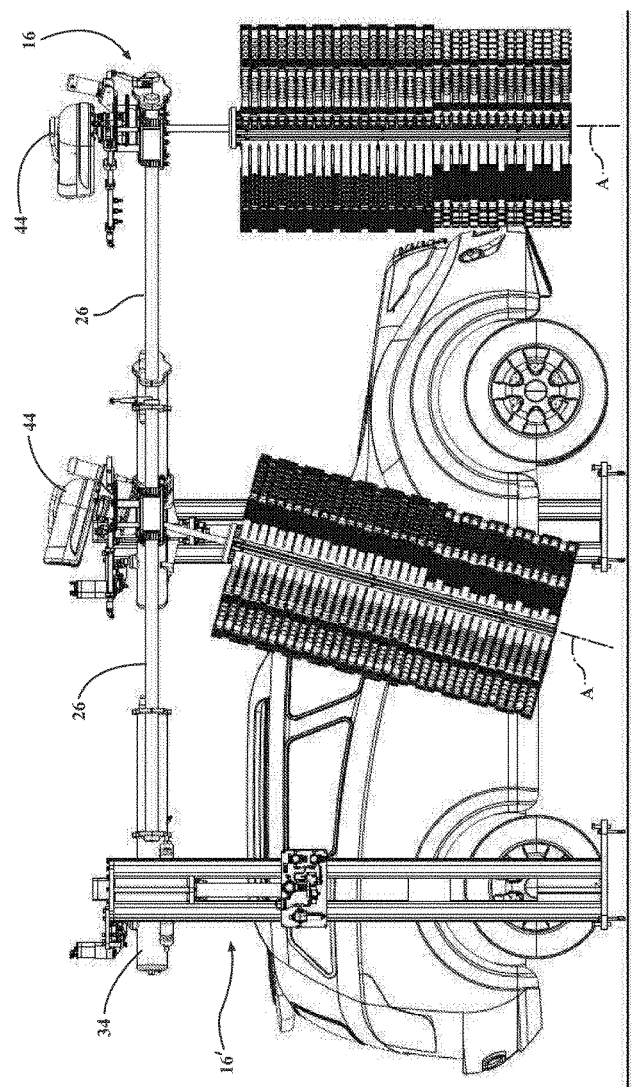
FIG. 8 is a side view of a vehicle treatment component engaging forward and side portions of a vehicle according to an aspect of the disclosure.

According to an aspect and with reference to FIGS. 7 and 8, as the vehicle 14 continues to travel forward, the first brush assembly 16 can reach the corner of the vehicle 14 and then begin contact with a side surface of the vehicle 14. At this point, the second brush assembly 16' can contact the vehicle front surface. According to another aspect, as the first brush assembly 16 begins to travel down the side surface of the vehicle 14, the boom portion 26 may begin to retract such that the outer arm portion 54 is telescopically received in the inner arm portion 52. Put another way, the length of the boom portion 26 can be shortened compared to its full length. Additionally, according to another aspect, the support carrier 70 can move away from the outer end 38, which can trigger the cylinder 74 to move to the extended position (FIG. 5) such that the shaft portion 24 is mechanically moved to a cocked angle as the wash media elements 46 contact the side of the vehicle 14. It will be appreciated that the support carrier 70 can be moved or permitted to move from the outer end 38 in a variety of different ways. According to an aspect, the movement can be accomplished by a controller or control system.

According to a further aspect, as the first brush assembly 16 moves along the side of the vehicle 14, the second brush assembly 16' can move along the front surface of the vehicle 14. Once the second brush assembly 16' reaches the opposite front corner of the vehicle and beings to travel along the side of the vehicle, the boom portion 26 can retract and operate in the same manner as discussed above such that the second brush assembly 16' can move along the other side of the vehicle.

Figure 9:
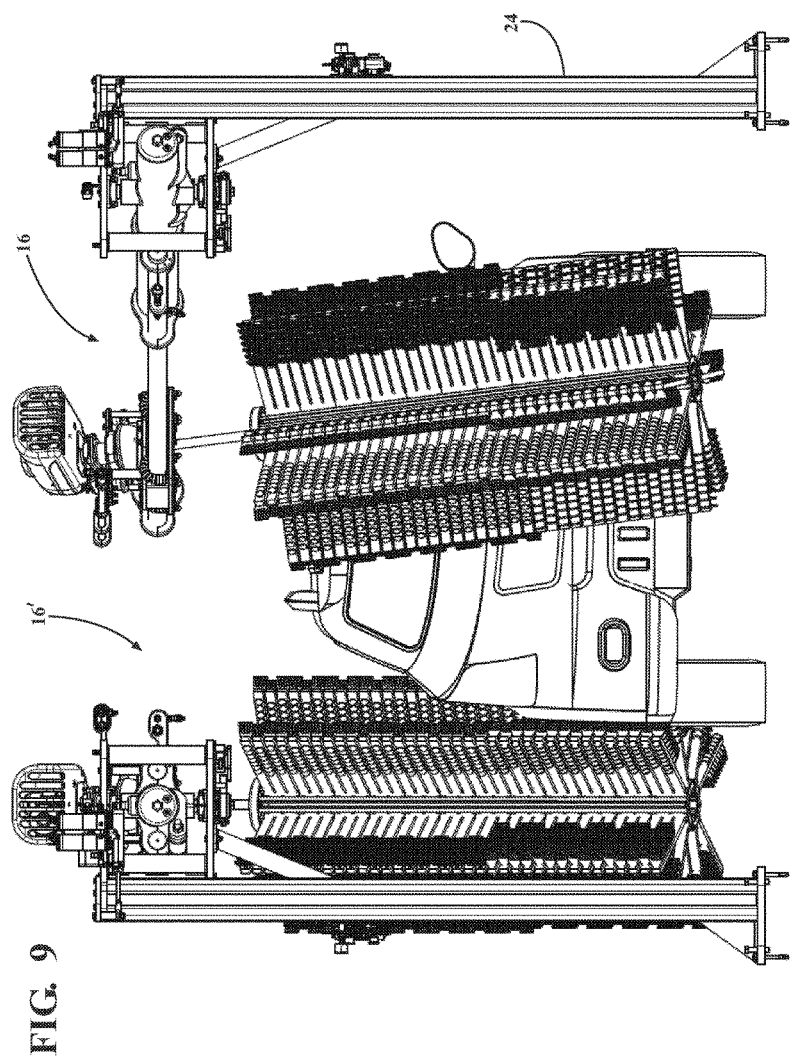
FIG. 9 is an end view of a vehicle treatment component engaging side and rear surfaces of a vehicle according to an aspect of the disclosure.
Figure 10:
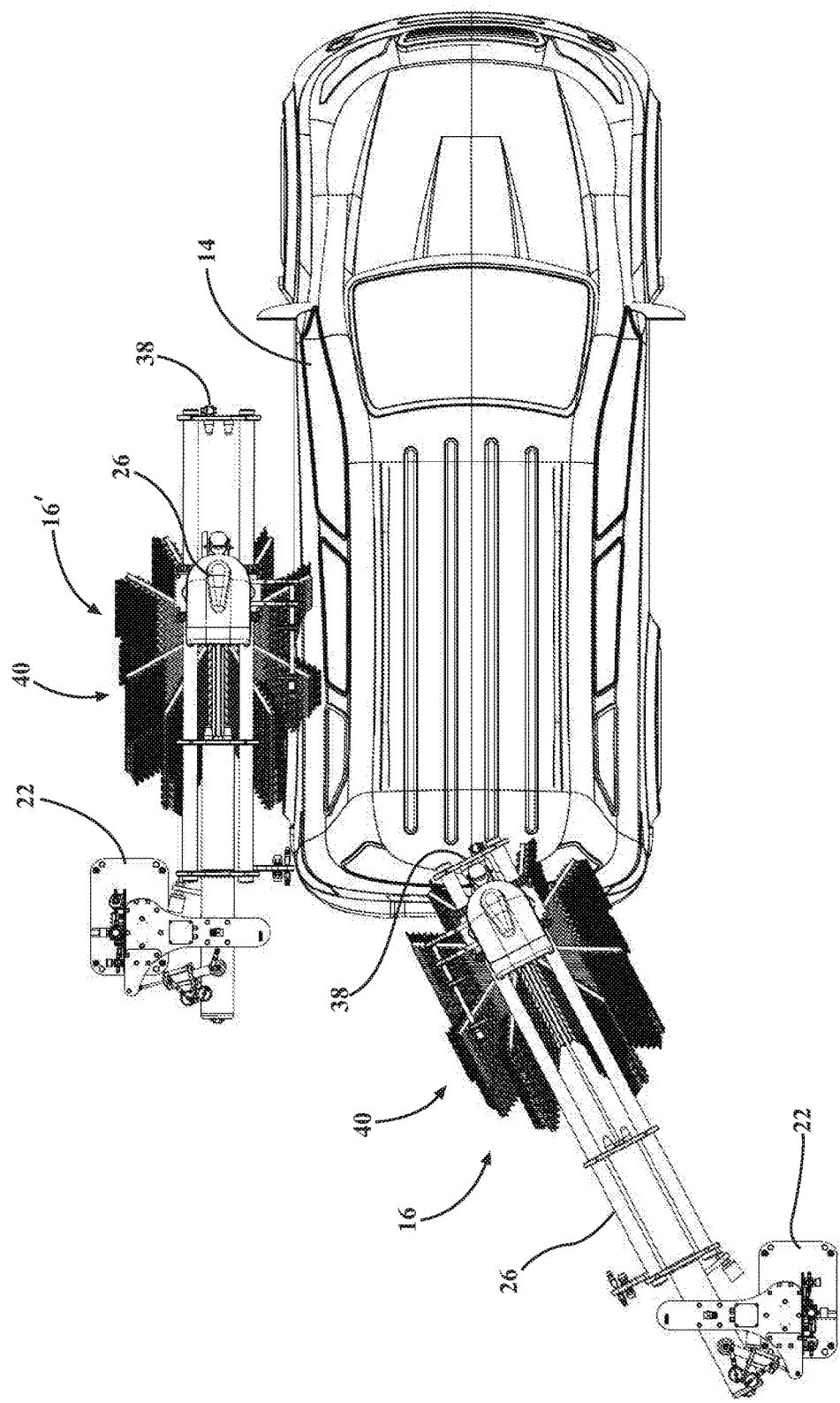
FIG. 10 is a top view of a vehicle treatment component engaging side and rear surfaces of a vehicle according to an aspect of the disclosure.
Figure 11:
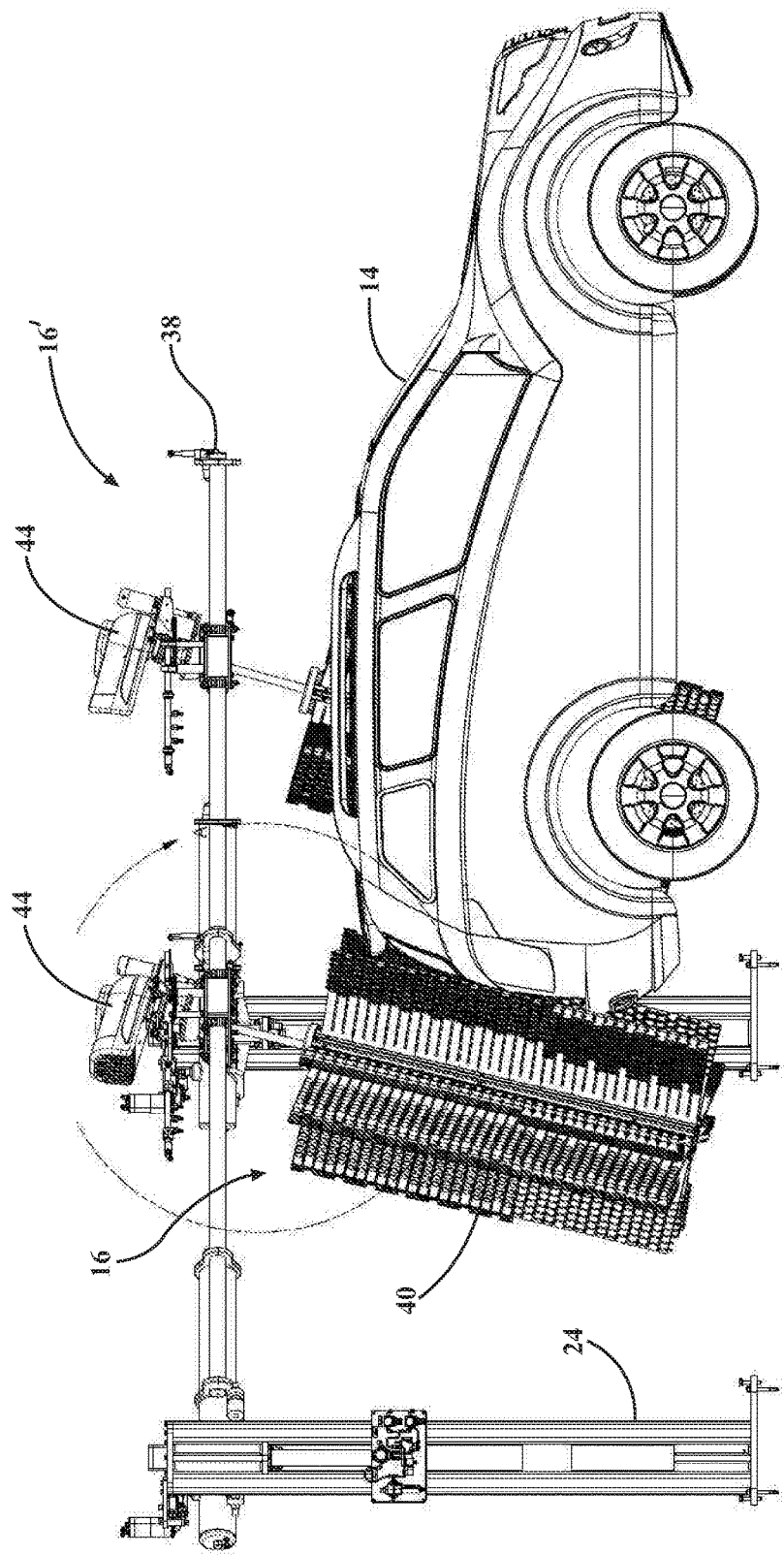
FIG. 11 is a side view of a vehicle treatment component engaging side and rear surfaces of a vehicle according to an aspect of the disclosure.

According to a further aspect and with reference to FIGS. 9 through 11, as the vehicle 14 continues to travel forward through the vehicle treatment area 14, the first brush assembly 16 can reach the rear side surface of the vehicle 14 and move around the rear corner of the vehicle to engage the rear vehicle surface. As shown, in this instance, the support carrier 70 can move further rearward within the channel portion 56. As the support carrier 70 is still moved away from the outer end 38 of the boom portion 26, the shaft portion 42 can still be cocked or mechanically disposed at an angle. According to an aspect, the first brush assembly 16 may be biased outwardly (toward the vehicle treatment area) such that a force may be applied against the rear surface of the vehicle 14. Also, the angle of the shaft portion 42 and thus the first brush assembly 16 with respect to plum or vertical can allow for improved cleaning of rear vehicle surfaces that may be angled. According to an aspect, the support carrier 70 can travel along the rear surface of the vehicle with the carrier assembly 70 moving inwardly within the channel portion 56 (in the direction of the outer end 38) as the vehicle travels forward. This allows for increased contact of the brush assembly 40 with the rear surface of the vehicle or increased dwell time.

As also shown, the second brush portion 16' can remain in contact with and move along the opposing side of the vehicle 14. The second brush portion 16' and the configuration of the boom portion 26 can operate and be configured in the same manner as the first brush portion 16. It will be appreciated that as the vehicle 14 continues to travel forward, it will move away from the first brush assembly 16, which has moved to the outer end 38 of the boom portion 26. According to an aspect, the second brush portion 16' can reach the rear side surface of the vehicle 14 and move around the rear corner of the vehicle to engage the rear vehicle surface. As shown, the support carrier 70 can move further rearward within the channel portion 56. As the support carrier 70 is still moved away from the outer end 38 of the boom portion 26, the shaft portion 42 can still be cocked or mechanically disposed at an angle. According to an aspect, the second brush assembly 16' may be biased outwardly such that a force may be applied against the rear surface of the vehicle 14. Also, the angle of the shaft portion 42 and thus the second brush assembly 16' with respect to plum or vertical can allow for improved cleaning of rear vehicle surfaces that may be angled. Once the vehicle 14 moves away from each of the first brush portion 16 and the second brush portion 16', it can move to the position shown in FIG. 1 so it is positioned to treat another vehicle.

Figure 12:
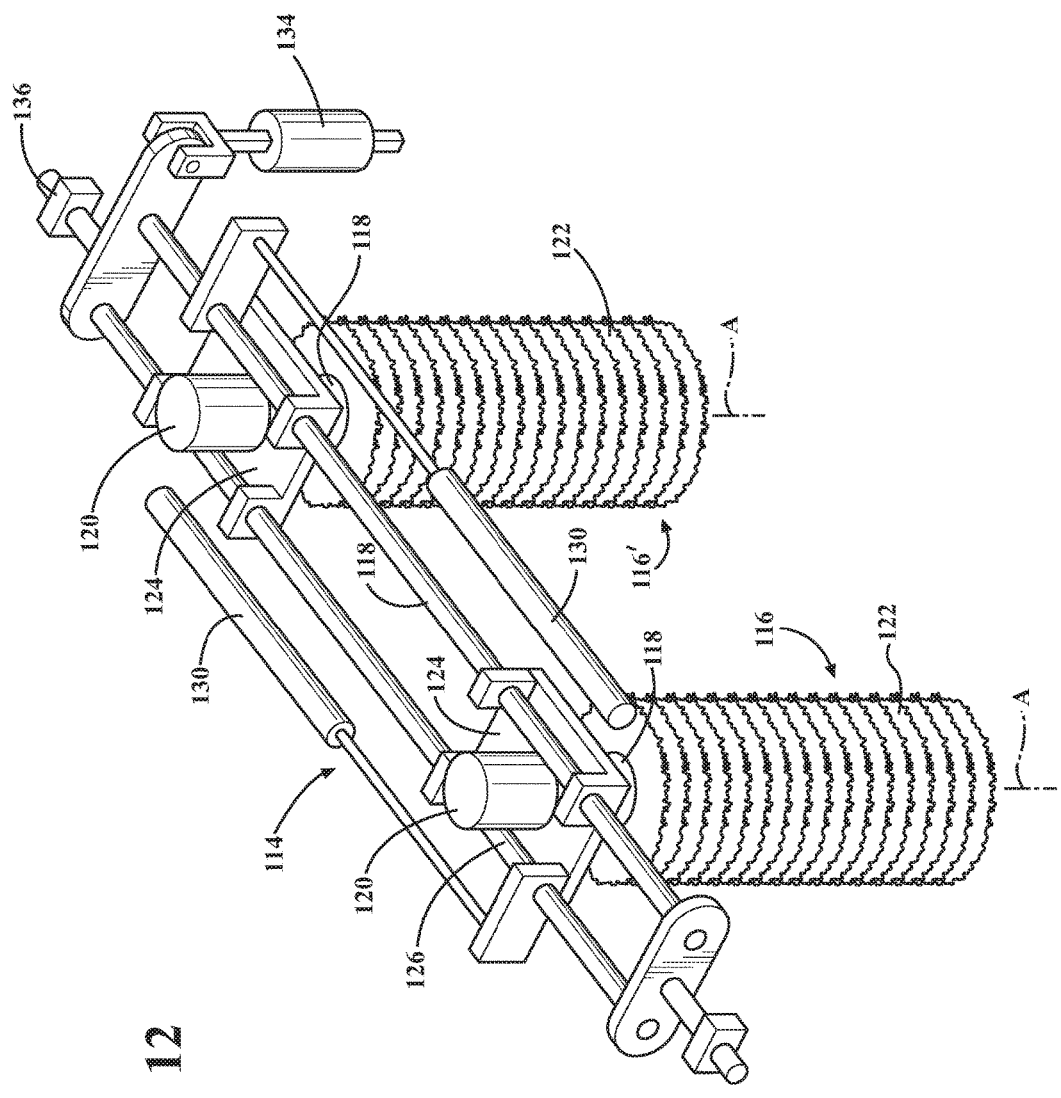
FIG. 12 is a schematic illustration of a vehicle treatment component for a vehicle wash system according to another aspect of the disclosure.
Figure 13:
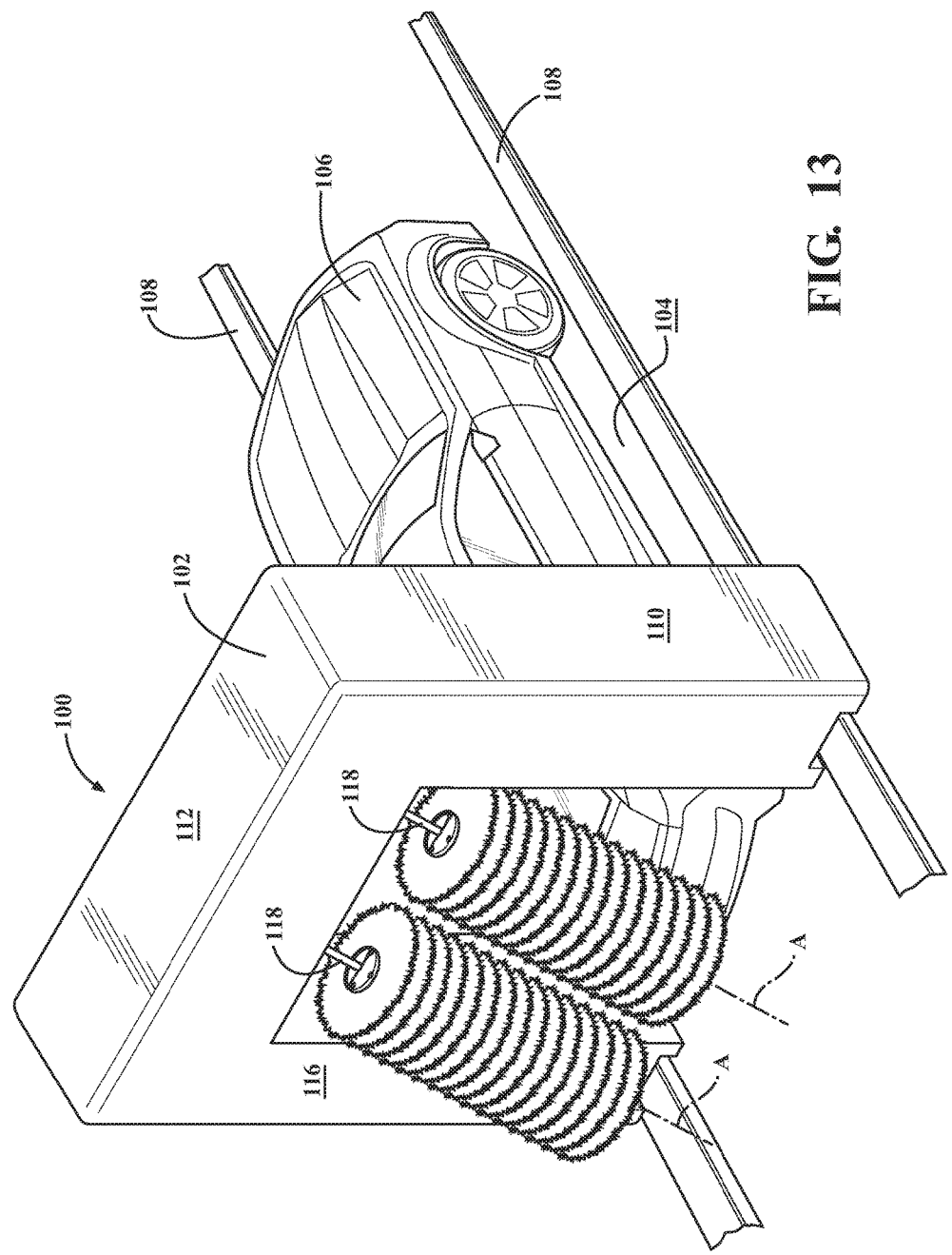
FIG. 13 is a perspective view of a vehicle treatment component engaging rear surfaces of a vehicle according to another aspect of the disclosure.

According to another aspect shown in FIGS. 12 and 13, a wrap-around brush assembly 100 is illustrated. The brush assembly 100 can include a frame portion 102 that is disposed adjacent a vehicle treatment area 104 for treating a vehicle 106 disposed therein. According to this aspect, the wrap-around brush assembly 100 can be part of a roll-over or in-bay vehicle wash system, where the vehicle 106 remains stationary while the assembly 100 moves with respect to the vehicle 106. As shown, the frame portion 102 may be in communication with rails 108 disposed on either side of the vehicle treatment area 104 to allow the frame portion 102 to move linearly therealong under direction of a controller or control system According to an aspect, the frame 102 can include a pair of vertical supports 110 and an overhead portion 112. It will be appreciated that the frame 102 can have a variety of different configurations.

The overhead portion 112 can include a support portion 114 in communication with the first and second brush portions 116, 116'. According to an aspect, each brush portion 116, 116' can include a shaft portion 118 having an axis of rotation, a drive mechanism 120 in communication with the shaft portion 118, and a plurality of wash media elements 122 that are rotatable with the shaft portion 118. Each brush portion 116, 116' may be in communication with the support portion 114 by a support carrier 124. As shown, the support portion 114 can include a pair of spaced apart rails 126, 128 that engage the support carrier 124. The support portion 114 can also include a pair of cylinder portions 130 that can communicate with the support carriers 124 to effectuate linear movement thereof along the rails 126, 128 to engage front and rear surfaces of a vehicle 106. According to an aspect, the cylinder portions 130 can each communicate with a respective linear slide 132 that will cause the first and second brush portion 116, 116' to move linearly toward and away from one another. In other words, the cylinder portions 130 can be actuated by the control system to move to an extended position such that the brush portions 16, 16' are disposed adjacent to one another. It will be appreciated that a variety of other suitable mechanism for translating the supporting carriers 124 along the rails 126, 126' may be employed.

According to an aspect, the support portion 114 may be in communication with a tilting mechanism 134 that can cause the support portion 112 to pivot about a bearing 136 such that the axis of rotations of the first and second brush portions 116, 116' can be oriented at a non-vertical angle as shown in FIG. 13. It will further be appreciated that a variety of other suitable mechanism for changing or varying the brush axes of rotation may be employed.

According to an aspect, in operation, at the start of the wash process, the first and second brush portions 116, 116' can be disposed close to one another adjacent a centerline of the vehicle treatment area as directed by the cylinder portions 130 under direction by the control system. In this configuration, the axis of rotation of the first and second brush portions 116, 116' are disposed generally vertically or perpendicularly to ground. The frame portion 102 may be brought into communication with a front end of the vehicle by moving it along the rails 108. As the brush portions 116, 116' rotate about this axis of rotation to treat the vehicle front surface, they can move linearly outward (away from one another and a centerline of the vehicle treatment area) across the front surface of the vehicle. When the brush portions 116, 116' reach the front corner of the vehicle, the control system can actuate the tilting mechanism 134 such that the axis of rotation of the brush portions 116, 116' may be disposed at an angle with respect to vertical.

The frame portion 102 can then move rearwardly to translate the first and second brush portions 116, 116' along a respective side of the vehicle with the brush portions 116, 116' tilted such that the axis of rotation may be angled with respect to horizontal. When the brush portions 116, 116' reach the rear corners of the vehicle, the frame portion 102 may be directed to stop. Thereafter, the cylinder portion 130 may be caused to retract so that the support carriers 124 move along the rails toward one another to move the brush portions 116, 116' along the rear surface of the vehicle. According to an aspect, the process can be repeated in reverse as will be understood by one of ordinary skill.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The invention claimed is:

1. An automated vehicle treatment system, comprising:
 a frame portion to be disposed adjacent a vehicle treatment area;
 a brush assembly configured to treat at least front and rear surfaces of a vehicle in the vehicle treatment area;
 a motorized shaft in communication with the brush assembly to effectuate rotation thereof about an axis of rotation;
 a plurality of media attachment mechanism in communication with the motorized shaft;
 a plurality of wash media elements extending generally outward from the plurality of media attachment mechanism and rotatable about the axis of rotation;
 a biasing mechanism for urging the motorized shaft from a substantially vertical position to a non-vertical position;
 a control system in communication with the brush assembly and configured to control its movement such that it traverses the front surface of the vehicle with the shaft in a substantially vertical position and traverse the rear surface of the vehicle with the shaft in a non-vertical position.

2. The vehicle treatment system of claim 1, wherein the control system is configured to move the brush assembly such that it traverses a side surface of the vehicle with the shaft in a non-vertical position.

3. The vehicle treatment system of claim 1, wherein the frame portion includes a boom portion that is pivotal between a first position disposed generally over the vehicle treatment area and a second position generally retracted from the vehicle treatment area.

4. The vehicle treatment system of claim 3, wherein in the second position the boom portion is oriented generally parallel to a direction of travel of the vehicle in the vehicle treatment area.

5. The vehicle treatment system of claim 3, further comprising:
 a support carrier in communication with and moveable with respect to the frame portion;
 wherein the support carrier is disposed within an inner channel of the boom portion and slideably moveable therein.

6. The vehicle treatment system of claim 5, further comprising:
 a spherical bearing coupled to an upper end of the motorized shaft, the spherical bearing in nesting engagement with the support carrier to allow the motorized shaft to move between the substantially vertical position and the non-vertical position.

7. The vehicle treatment system of claim 6, wherein the biasing mechanism includes a cylinder in communication with the spherical bearing, the cylinder being actuatable between a retracted position and an extended position, wherein in the retracted position, the brush assembly is locked in the substantially vertical position and wherein in the extended position, the brush assembly is locked in the non-vertical position.

8. The vehicle treatment system of claim 3, wherein the boom portion includes an inner arm portion and an outer arm portion in telescopic communication with the inner arm portion to translate the brush assembly with respect to the vehicle treatment area to traverse the front surface and the rear surface of the vehicle.

9. The vehicle treatment system of claim 3, further comprising:
 a second biasing mechanism in communication with the boom portion to urge the brush assembly toward the vehicle treatment area.

10. The vehicle treatment system of claim 1, further comprising:
 a plurality of spray nozzles disposed on the frame portion and in communication with the brush assembly.

11. The vehicle treatment system of claim 1, wherein the wash media elements are constructed of a self-supporting material such that they are configured to extend generally perpendicularly to the motorized shaft when at rest.

12. The vehicle treatment system of claim 1, wherein the automated system is incorporated into an in-bay system.

13. A vehicle treatment system, comprising:
 a support portion configured to be disposed adjacent a vehicle treatment area;
 a brush positioning portion coupled to the support, and
 a brush portion coupled to the brush positioning portion, the brush portion including:
  a motorized shaft rotatable about an axis of rotation; and
  a plurality of wash media elements in communication with the motorized shaft;
 a control system in communication with the brush portion and configured to pivot the brush portion between a first position where the axis of rotation is oriented generally perpendicular to ground and a second position where the axis of rotation is oriented at a non-ninety degree angle with respect to ground;
 whereby the control system is configured to orient the brush portion in the first position for treating a front portion of a vehicle in the vehicle treatment area and further configured to orient the brush portion in the second position in for treating a rear portion of the vehicle in the vehicle treatment area.

14. The vehicle treatment system of claim 13, wherein the brush positioning portion consists of a boom portion including an inner arm portion and an outer arm portion that are in telescopic communication to translate the brush portion with respect to the vehicle treatment area.

15. The vehicle treatment system of claim 14, wherein the boom portion includes an inner channel portion that receives the drive shaft as the brush portion is translated along the boom portion.

16. The vehicle treatment system of claim 14, further comprising:
a spherical bearing coupled to an upper end of the drive shaft, the spherical bearing in nesting engagement with the support carrier to allow the brush portion to be pivoted between the first position and the second position.

17. The vehicle treatment system of claim 16, further comprising:
a cylinder in communication with the spherical bearing, the cylinder being actuatable between a retracted position and an extended position, wherein in the retracted position, the brush portion is locked in the first position and wherein in the extended position, the brush portion is locked in the second position.

18. The vehicle treatment system of claim 14, further comprising:
a biasing mechanism in communication with the boom portion to urge the brush portion toward the vehicle treatment area.

19. The vehicle treatment system of claim 14, wherein the boom portion is pivotable between a first position where the second end portion is disposed over the vehicle treatment area and a second position where the second end portion is disposed adjacent the vehicle treatment area.

20. The vehicle treatment system of claim 13, further comprising:
a support carrier coupled to an upper end of the motorized shaft and in slideable communication with the overhead portion to move the brush portion therealong.

21. The vehicle treatment system of claim 13, further comprising:
a plurality of spray nozzles disposed on the overhead portion and in communication with the brush portion.

22. The vehicle treatment system of claim 13, wherein the wash media elements are constructed of a self-supporting material such that they are configured to extend generally perpendicular to the drive shaft when at rest.

23. The vehicle treatment system of claim 13, wherein the system is incorporated into an in-bay wash system.

24. A brush assembly for a vehicle treatment system, comprising:
a generally vertical support portion configured to be disposed adjacent a vehicle treatment area;
a track portion in communication with the vertical support portion;
a brush assembly coupled to the track portion, the brush assembly having a plurality of wash media elements in communication with a drive shaft having an axis of rotation;
a support carrier in communication with the brush assembly and is moveable communication with the track portion to translate the brush assembly between a washing position and a retracted position;
an actuator in communication with the brush assembly and configured to pivot the brush assembly between a first position where the axis of rotation is oriented generally perpendicular to ground and a second position where the axis of rotation is oriented at an angle with respect to ground;
whereby the actuator is in communication with a controller, which is configured to orient the brush assembly in the first position for treating a front surface of a vehicle in the vehicle treatment area and in the second position for treating a side surface and a rear surface of a vehicle in the vehicle treatment area.

25. The brush assembly of claim 24, further comprising:
a spherical bearing disposed in nesting engagement with the support carrier, the spherical bearing coupled to the drive shaft adjacent an upper end thereof.

26. The brush assembly of claim 25, wherein the actuator is a cylinder disposed on the support carrier the cylinder configured to move between a retracted position and an extended position to pivot the brush assembly between the first position and the second position.

27. The brush assembly of claim 26, further comprising:
a lever arm extending between and connecting the cylinder and the spherical bearing to effectuate movement of the brush assembly between the first position and the second position.

28. The brush assembly of claim 26, further comprising:
a switch arm disposed adjacent the outer end of the track portion, the switch arm in communication with the cylinder to effect the retracted position when the support carrier is located at the outer end and to effect the extended position when the support carrier moves away from the outer end.

29. The brush assembly of claim 24, further comprising:
a biasing mechanism in communication with the boom portion to urge the brush assembly toward an outer end of the track portion.

30. The brush assembly of claim 24, wherein the track portion includes a hollow interior channel that receives the drive shaft as the support carrier portion travels between an inner end and the outer end of the track portion.

31. The brush assembly of claim 24, wherein the brush assembly includes a motor portion disposed on the support carrier for effectuating rotation of drive shaft.

32. The brush assembly of claim 24, further comprising:
a plurality of spray nozzles disposed on the track portion and in communication with the brush assembly.

33. The brush assembly of claim 24, wherein the wash media elements are constructed of a self-supporting material such that they are configured to extend generally perpendicularly to the drive shaft when at rest.

* * * * *